United States Patent
Masaki et al.

(10) Patent No.: US 7,926,351 B2
(45) Date of Patent: Apr. 19, 2011

(54) PRESSURE SENSOR AND DATA INPUT APPARATUS

(75) Inventors: Kazuo Masaki, Hamamatsu (JP); Shuichi Sawada, Hamamatsu (JP); So Tanaka, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/332,714

(22) Filed: Dec. 11, 2008

(65) Prior Publication Data
US 2009/0151475 A1      Jun. 18, 2009

(30) Foreign Application Priority Data

Dec. 13, 2007   (JP) .................................. 2007-321952
Dec. 13, 2007   (JP) .................................. 2007-321953

(51) Int. Cl.
*G01L 9/12* (2006.01)
(52) U.S. Cl. ........................................... 73/718; 73/724
(58) Field of Classification Search ........................ None
See application file for complete search history.

(56) References Cited

FOREIGN PATENT DOCUMENTS

| EP | 1 128 174 A2 | 8/2001 |
|---|---|---|
| JP | 03-107900 A | 5/1991 |
| WO | WO-02/089038 A2 | 11/2002 |

OTHER PUBLICATIONS

Partial European Search Report mailed Dec. 13, 2010, for EP Application No. 08171179.8, six pages.

*Primary Examiner* — Andre J Allen
(74) *Attorney, Agent, or Firm* — Morrison & Foerster LLP

(57) ABSTRACT

Grounded, circular movable electrode and divided electrodes, formed on a surface of a circular printed board, are opposed to each other via a double-face tape, functioning also as a spacer, with a slight gap interposed therebetween. As a pad is struck with a stick, the gap between the movable electrode and the divided electrodes changes so that capacitance between the movable electrode and the divided electrodes changes, in response to which signals are output from the divided electrodes. The divided electrodes are sandwiched between the grounded movable electrode and a grounded shielded electrode and thus are not influenced from external disturbances. As the pad is struck with the stick, the gap and hence capacitance between the movable electrode and any of the divided electrodes in the struck position changes, in response to which signals are output from the divided electrodes

30 Claims, 12 Drawing Sheets

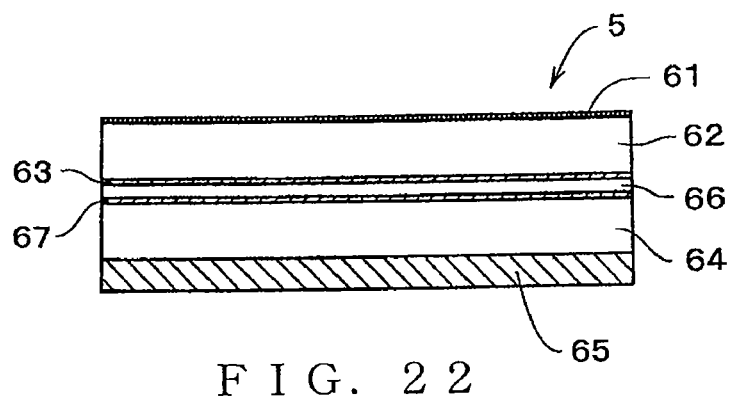
F I G. 2 2
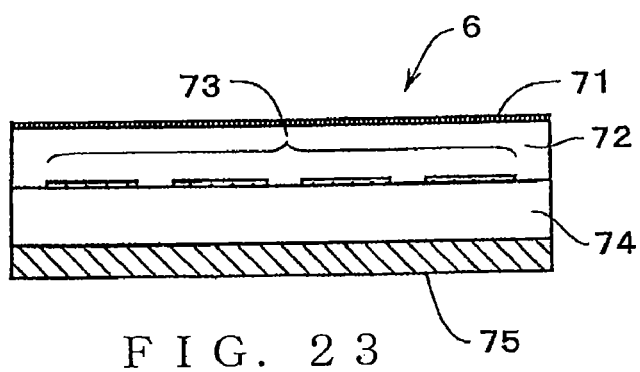
F I G. 2 3
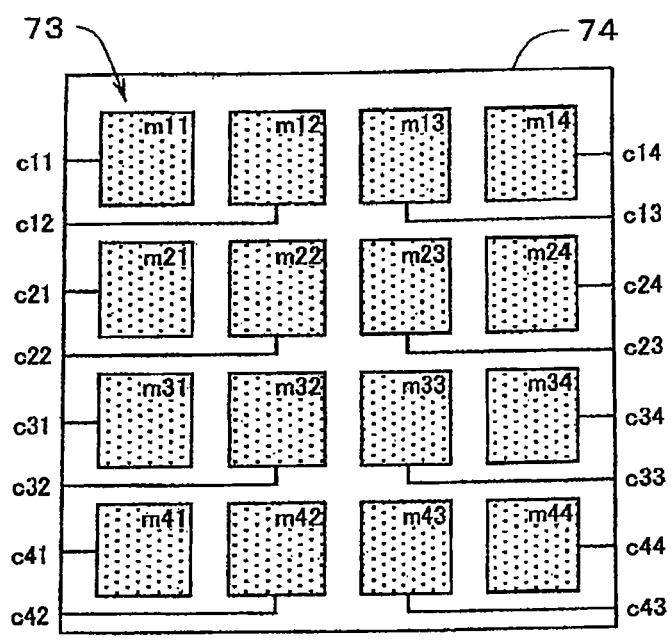
F I G. 2 4

PRESSURE SENSOR AND DATA INPUT APPARATUS

BACKGROUND

The present invention relates to a pressure sensor and data input apparatus which are capable of inputting operation information and which are suited for application to performance information input apparatus for inputting performance information.

FIG. 25 is a sectional view showing an example of a pressure sensor employed in a conventionally-known electronic percussion instrument, which is disclosed, for example, in Japanese Patent Publication No. 2944042. The pressure sensor 200 shown in FIG. 25 includes a lowermost layer in the form of an insulator 210, such as an insulating film, formed in a circular shape. Resistance surface 211 of a circular shape, formed for example of carbon, is attached to the upper surface of the insulator 210. Annular or ting-shaped electrode 213 is provided on and along the circumference of the resistance surface 211, and another electrode 212 is provided at the center of the resistance surface 211. Further, a pressure-sensitive resistance element 215 is provided over the resistance surface 211 with a predetermined space interposed therebetween. To provide such a predetermined space, an annular spacer 214 is interposed between the resistance surface 211 and the pressure-sensitive resistance element 215. Electrode 216 of a circular shape is attached to the upper surface of the pressure-sensitive resistance element 215. Further, a circular striking surface 217 formed of a flexible film is attached to the upper surface of the electrode 216. As the striking surface 217 of the pressure sensor 200 constructed in the aforementioned manner is struck with a stick, positions of the striking surface 217, electrode 216 and pressure-sensitive resistance element 215, corresponding to the struck position, flex so that the pressure-sensitive resistance element 215 contacts the resistance surface 211.

FIG. 26 shows an equivalent circuit among the electrodes 212, 213 and 216, where R1 represents a resistance value of the pressure-sensitive resistance element 215. Further, R2 and R3 represent resistance values of the resistance surface 211. Contact d between the resistance value R2 and the resistance value R3 is a struck position where the pressure sensitive resistance element 215 flexes to contact the resistance surface 211. Namely, the resistance value R1 of the pressure sensitive resistance element 215 varies in accordance with a striking intensity of a stick, and a ratio between the resistance values R2 and R3 between the electrodes 212 and 213 varies in accordance with the struck position. In order to detect variations of these resistance values R1, R2 and R3, the electrodes 212, 213 and 216 are connected to intensity/position separation circuitry 220. In the intensity/position separation circuitry 220, resistances of a fixed resistance value are connected to the electrodes 212 and 213 to construct a bridge circuit, and a constant current supply is connected between the bridge circuit and the electrode 216. Thus, the struck position is detected by measuring a voltage across the electrode 213, and the striking intensity is detected by measuring a voltage between the bridge circuit and the electrode 216.

Then, a not-shown tone generator is controlled, on the basis of information of the detected striking intensity and struck position, to generate a tone corresponding to the striking intensity and struck position. The thus-generated tone is amplified and audibly sounded through a speaker.

However, with the conventionally-known pressure sensor for inputting performance information through resistance change, detecting accuracy of the struck position can not be enhanced because it is not easy to make the resistance surface 211 of a uniform electric conductivity. Further, because it takes a considerable time to detect, from voltage values of the plurality of electrodes, performance information comprising information of a striking intensity and struck position, which would thereby lead to a slow speed of response. Therefore, when the striking surface 217 is repetitively struck with the stick at high speed, the detecting capability of the pressure sensor 200 may not be able to appropriately follow the high-speed striking. Further, because an expensive pressure-sensitive resistance element 215 having a great area is required, the necessary manufacturing cost would increase. Furthermore, the conventional pressure sensor 200 is unable to appropriately respond or behave when striking forces are simultaneously applied to two or more positions of the striking surface 217.

Pressure sensor using capacitance change, in place of resistance value change, for performance information input is also conceivable. Such a pressure sensor using capacitance change (i.e., capacitance-change-based pressure sensor) can dispense with the resistance surface and pressure-sensitive resistance element. Further, the capacitance-based pressure differs in principle from the conventional pressure sensor using resistance change (i.e., resistance-change-based pressure sensor) in terms of the manner in which information of a striking intensity and struck position is detected, and thus, it can avoid the inconveniences of the conventional pressure sensor. Note that the capacitance used by the capacitance-change-based pressure sensor is one produced through opposed electrodes; namely, the capacitance changes due to change of a space between the opposed electrodes in response to input of performance information. However, such a capacitance-change-based pressure sensor tends to be unavoidably susceptible to an external disturbance because the capacitance changes as part of a human body, metal or the like approaches the electrodes. Therefore, the capacitance-change-based pressure sensor must be kept at a relatively low sensitivity. Besides, with the capacitance-change-based pressure sensor, where the capacitance change does not differ between different struck positions, it is difficult to detect different struck positions.

SUMMARY OF THE INVENTION

In view of the foregoing, it is an object of the present invention to provide an improved pressure sensor of a type using a capacitance change which is reliably resistant to external disturbances, and a data input apparatus using such an improved pressure sensor to input operation information, performance information, etc.

It is another object of the present invention to provide an improved pressure sensor using a capacitance change which can readily detect a pressure-applied position, and a data input apparatus using such an improved pressure sensor to input operation information, performance information, etc.

According to one aspect of the present invention, there is provided an improved pressure sensor, which comprises: a grounded, planar movable electrode; a planar fixed electrode having one surface opposed to the movable electrode with a predetermined space interposed therebetween, the movable electrode and the fixed electrode together constituting a capacitance element; and a grounded shielding conductor opposed to another surface of the fixed electrode with a predetermined space interposed therebetween. Here, as a pressure is applied to said movable electrode, capacitance of the capacitance element is changed with displacement of said movable electrode, and a signal corresponding to the pressure is output from said fixed electrode on the basis of the capacitance of the capacitance element.

By the provision of the grounded, planar movable electrode, the planar fixed electrode having one surface opposed to the movable electrode with a predetermined space interposed therebetween and the grounded shielding conductor opposed to the other surface of the fixed electrode with a predetermined space interposed therebetween, the fixed electrode, constructed to output capacitance change information indicative of a capacitance change of the capacitance section produced as a pressure is applied to the movable electrode to partly displace the movable electrode, is sandwiched between the grounded movable electrode and the grounded shielding conductor. The fixed electrode can be appropriately resistant to external disturbances and thus can operate with an increased sensitivity. Further, by constructing the fixed electrode of a plurality of divided electrodes, a struck position can be detected with an enhanced accuracy and an increased speed, so that the pressure sensor of the invention can achieve an increased speed of response and thereby appropriately follow inputs repeated at high speed. Further, the pressure sensor of the invention is very simple in construction and thus can be manufactured at low cost. Further, even when striking force is simultaneously applied to two or more positions, the pressure sensor of the invention can appropriately respond.

According to another aspect of the present invention, there is provided an improved pressure sensor, which comprises: a planar fixed electrode opposed to said movable electrode with a predetermined space interposed therebetween and having a plurality of divided electrodes, said movable electrode and each of said plurality of divided electrodes together constituting a capacitance element, wherein, as a pressure is applied to said movable electrode to displace said movable electrode, signals output from said plurality of divided electrodes on the basis of capacitance of the capacitance element are added together so that a sum of the signals is output as a sensor output signal indicative of intensity of the pressure, and position information indicative of a position of a particular one of the divided electrodes which has output a signal of a maximum level among the signals output from said plurality of divided electrodes is output as pressure-applied-position information indicating a position of said movable electrode to which the pressure has been applied.

By the provision of the planar movable electrode and the planar fixed electrode opposed to the movable electrode with the predetermined space interposed therebetween and having the plurality of divided electrodes, a sensor output signal can be provided as a pressure is applied to the movable electrode by adding together signals output from the plurality of divided electrodes. Also, a pressure-applied-position of the movable electrode, to which the pressure has been applied, can be detected by detecting a particular one of the divided electrodes which has output a signal of a maximum level among the signals output from the plurality of divided electrodes. Further, when two signals are output from two adjoining ones of the divided electrodes, a position in a boundary portion between the two adjoining divided electrodes is calculated in accordance with the respective levels of the two signals.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 22 is a sectional front view showing a construction of a modification of the third embodiment of the pressure sensor;

FIG. 23 is a sectional front view showing a fourth embodiment of the pressure sensor of the invention;

FIG. 24 is a top plan view showing a construction of a print film employed in the fourth embodiment of the pressure sensor;

DETAILED DESCRIPTION

Figure 1:
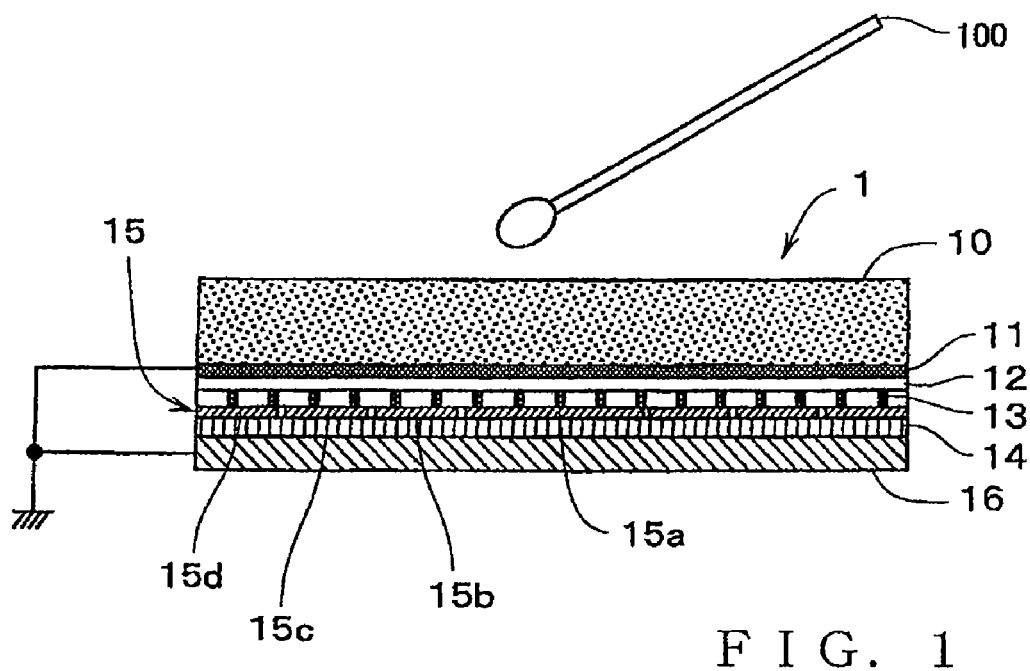
FIG. 1 is a sectional front view showing a construction of a first embodiment of the pressure sensor of the present invention.

Pressure sensor of the present invention can be applied not only to an input apparatus, such as a game machine or controller connected to a game machine, for inputting operation information, but also to a performance information input apparatus for an electronic percussion instrument, such as an electronic drum. The input apparatus and performance information input apparatus to which the pressure sensor of the present invention is applied are each a data input apparatus of the present invention. Detailed description will be given hereinbelow about the pressure sensor of the present invention which is applicable to a performance information input apparatus. FIG. 1 is a sectional front view showing a construction of a first embodiment of the pressure sensor 1 of the present invention, FIG. 2 is a perspective view showing a construction of the pressure sensor, and FIG. 3 is an exploded view of the pressure sensor 1.

Figure 2:
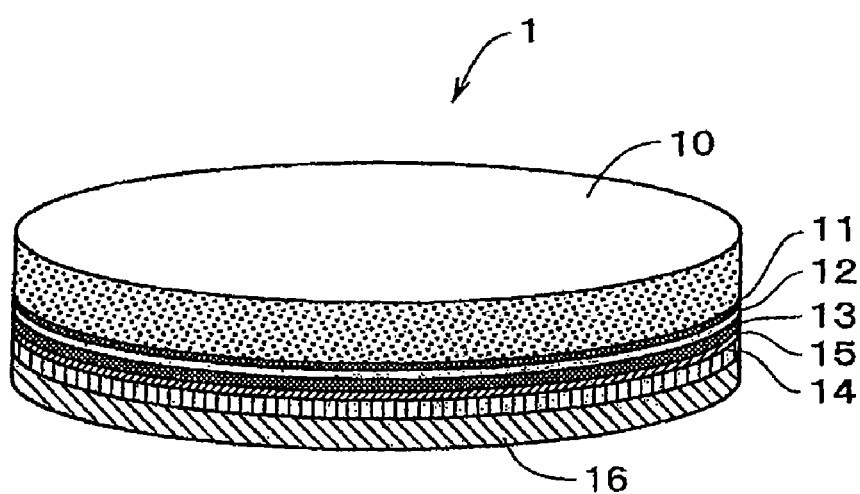
FIG. 2 is a perspective view of the first embodiment of the pressure sensor.
Figure 3:
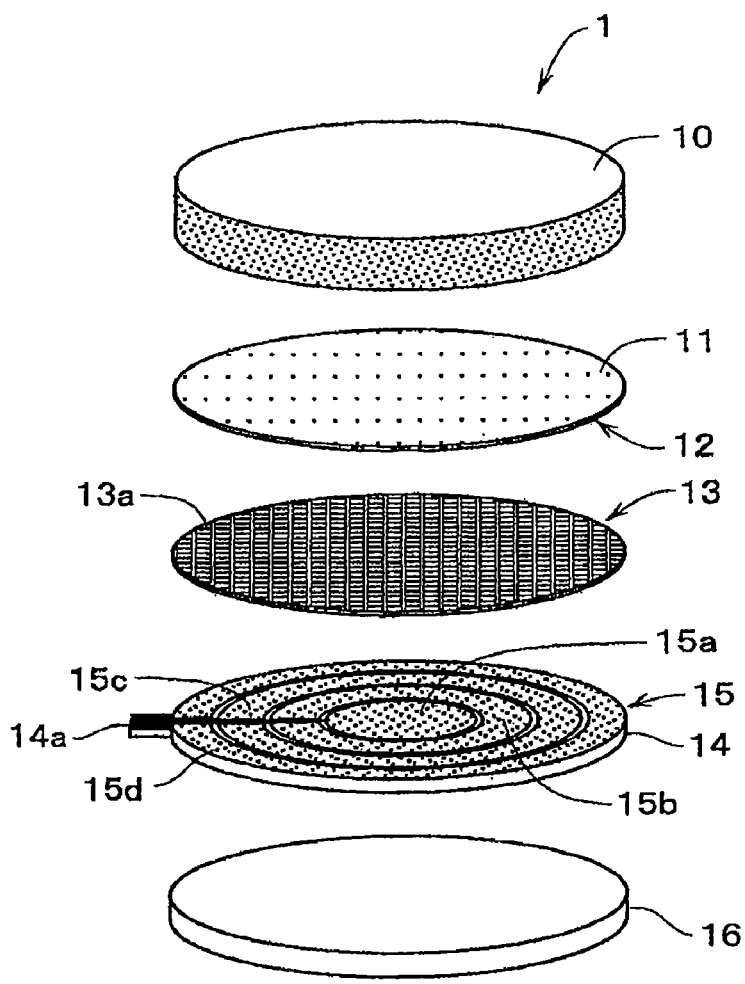
FIG. 3 is an exploded view of the first embodiment of the pressure sensor.

The first embodiment of the pressure sensor 1 shown in FIGS. 1-3 is a performance information input apparatus suited for application to an electronic percussion instrument, such as an electronic drum. On the outer or upper surface of the first embodiment of the pressure sensor 1 is disposed a disk-shaped pad 10 that provides a striking surface for being struck with a stick 100 or the like. Preferably, the pad 10 is formed of a resilient material, such as resin foam having closed cells so that a human player can obtain generally the same feel as when striking an acoustic drum. To the lower or underside surface of the pad 10 is attached a thin, circular, planar-shaped resin film 12 having a movable electrode 11 formed on its upper surface. The resin film 12 is formed of an insulting material, such as PET (Polyethylene Terephthalate), and the movable electrode 11 is formed on the entire upper surface of the resin film 12 by vapor deposition or the like.

Figure 4:
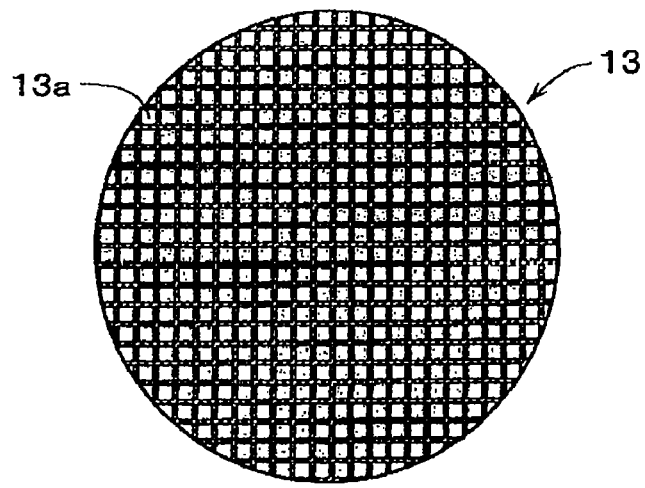
FIG. 4 is a top plan view showing a construction of a double-face tape employed in the first embodiment of the pressure sensor.
Figure 5:
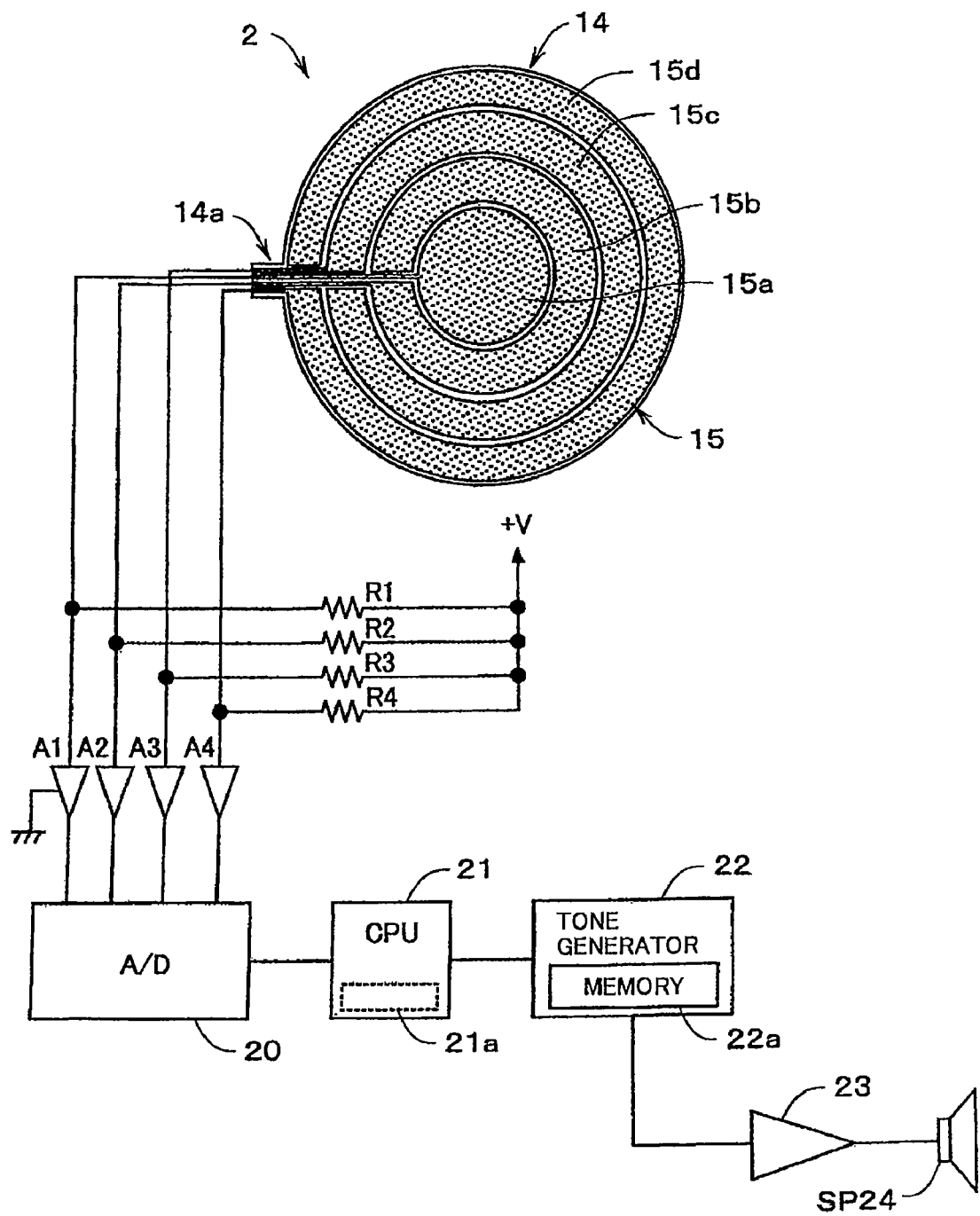
FIG. 5 is a block diagram showing a construction of an electronic percussion instrument having the first embodiment of the pressure sensor applied thereto.

The resin film 12 and a circular, planar-shaped printed circuit board 14 having a fixed electrode 15 formed thereon are attached to each other by means of a thin, circular double-face adhesive tape 13. As illustratively shown in FIG. 4, the circular double-face adhesive tape 13 has a multiplicity of rectangular recesses 13a formed therein at a predetermined pitch in vertical and horizontal arrays. Alternatively, the rectangular recesses 13a may be formed in the circular double-face adhesive tape 13 at a predetermined pitch in a generally concentric configuration. The double-face adhesive tape 13 is attached at its upper surface to the lower surface of the resin film 12 and attached at its lower surface to the upper surface of the printed circuit board 14 where the fixed electrode 15 is formed. The printed circuit board 14 is an electrically-insulating board, such as a glass epoxy board. As shown in FIGS. 3 and 5, the fixed electrode 15 is formed on one surface of the printed circuit board 14 by printing or etching and comprises four ring-shaped divided electrodes 15a to 15d arranged concentrically. Terminal section 14a for outputting signals from the first to fourth divided electrodes 15a to 15d is provided on the printed circuit board 14. The fixed electrode 15 provided on the printed circuit board 14 may comprise five or more divided ring-shaped electrodes rather than being limited to just four divided ring-shaped electrodes.

Further, a conductive shield electrode 16 formed, for example, of metal is attached to the underside surface of the printed circuit board 14. Because the fixed electrode 15 is sandwiched between the shield electrode 16 and the movable electrode 11 and the shield electrode 16 and movable electrode 11 are both grounded, the fixed electrode 15 is shielded by the two electrodes 16 and 11. Thus, even when a hand of a user or human operator approaches the pressure sensor 1, no signal is output from the fixed electrode 15 comprising the first to fourth divided electrodes 15a to 15d; in this way, the pressure sensor 1 can be reliably resistant to external disturbances. Further, the double-face adhesive tape 13 functions also as a spacer to allow the movable electrode 11 and fixed electrode 15 to be opposed to each other with a slight gap or space. Further, capacitance is produced between the movable electrode 11 and the individual divided electrodes 15 to 15d of the fixed electrode 15. For example, the pressure sensor 1 has an outer diameter of about 240 mm, the resin film 12 has a thickness of about 10 μm, and the double-face adhesive tape 13 has a thickness of about 170 μm. Further, the rectangular recesses 13a, each having a size of about 8 mm×8 mm, are formed with a pitch between the centers of every adjoining pair of the recesses measuring about 10 mm. Namely, the double-face adhesive tape 13 is formed so that lines of the tape 13, each having about 2 mm, are left around each of the rectangular recesses 13a. Note that, in each of the figures showing the first embodiment 1, the thicknesses (heights) of the various components are shown as enlarged or exaggerated as compared to their real thicknesses (heights) to facilitate understanding.

As the pad 10 is struck with the stick 100 in the first embodiment of the pressure sensor 1 constructed in the aforementioned manner, a struck position of the pad 10 is displaced or flexes downward, because of which the movable electrode 11 formed on the flexible resin film 12 too is displaced or flexes downward. The position of the movable electrode 11 having thus flexed gets into any of the rectangular recesses 13a, so that the space between the flexed position of the movable electrode 11 and a corresponding one of the first to fourth divided electrodes 15a to 15d of the fixed electrode 15 decreases. In this case, the space between the flexed position of the movable electrode 11 and the fixed electrode 15 can decrease up to the about 10 μm equal to the thickness of the flexible resin film 12. But, even when the space between the flexed position of the movable electrode 11 and the fixed electrode 15 decreases to about 10 μm, appropriate insulation between the flexed position of the movable electrode 11 and the fixed electrode 15 can be maintained by virtue of the flexible resin film 12 interposed between the flexed position of the movable electrode 11 and the fixed electrode 15. Namely, because the space between the movable electrode 11 and the divided electrodes 15a-15d decreases or narrows, the capacitance between the movable electrode 11 and the divided electrodes 15a-15d changes, so that output signals corresponding to the changed capacitance are output via the terminals of the terminal section 14a corresponding to the divided electrodes 15a-15d.

In this case, the amount of the flexure of the movable electrode 11 is generally proportional to a striking intensity with which the pad 10 has been struck with the stick 100, and the space between the movable electrode Hand the corresponding divided electrode 15a-15d decreases in accordance with the amount of the flexure. Thus, the output signals of the divided electrodes 15a-15d have levels corresponding to the striking intensity with which the pad 10 has been struck with the stick 100. Because the space between the flexed position of the movable electrode 11 and the divided electrodes 15a-15d can decrease up to about 10 μm and the fixed electrode 15 is shielded so as to be resistant to external disturbances, the dynamic range of the pressure sensor can be increased. Further, the output signal corresponding to the striking intensity is output only from one of the first to fourth divided electrodes 15a to 15d which corresponds to the position of the pad 10 struck with the stick 100, the struck position too can be detected by detecting the one of the first to fourth divided electrodes 15a to 15d which has output the output signal indicative of the struck, e.g., the output signal indicative of a maximum level among the signals output from the divided electrodes 15a to 15d.

FIG. 5 is a block diagram showing a construction of an electronic percussion instrument having the first embodiment of the pressure sensor 1 applied thereto, where only the printed circuit board 14 is shown for the pressure sensor 1.

Electrical leads extend from the individual first to fourth divided electrodes 15a to 15d of the fixed electrode 15, formed in a concentric ring configuration on one surface of the printed circuit board 14, to the terminal section 14a. More specifically, in the terminal section 14a, the electrical lead extending from the first divided electrode 15a is connected to a power supply +V by way of a resistor R1 and connected to a first amplifier A1, the electrical lead extending from the second divided electrode 15b is connected to the power supply +V by way of a resistor R2 and connected to a second amplifier A2, the electrical lead extending from the third divided electrode 15c is connected to the power supply +V by way of a resistor R3 and connected to a third amplifier A3, and the electrical lead extending from the fourth divided electrode 15d is connected to the power supply +V by way of a resistor R4 and connected to a fourth amplifier A4. Namely, the first to fourth divided electrodes 15a to 15d are pulled up to the power supply +V via the resistors R1-R4, and thus, when the capacitance between the first to fourth divided electrodes 15a to 15d and the movable electrode 11 changes, an electric signal corresponding to the changed capacitance is output from the fixed electrode 15.

Signals output from the first to fourth divided electrodes 15a to 15d are each converted via an A/D converter 20 into a digital signal. CPU (Central Processing Unit) 20 processes the digital signal output from the A/D converter 20 to detect the striking intensity and struck position at which the pressure sensor 1 has been struck with the stick 100. It is preferable that the ring-shaped, first to fourth divided electrodes 15a to 15d each have an equal area; however, in a case where they can not be formed to have an equal area, the CPU 20 is provided with a compensating table 21a for compensating for the different areas of the divided electrodes 15a to 15d. Namely, in the case where the first to fourth divided electrodes 15a to 15d are not equal in area, each divided electrode having a small area would present a great capacitance change rate while each divided electrode having a great area would present a small capacitance change rate even for a same striking force applied; namely, in this case, the output signal level differs among the divided electrodes 15a to 15d even for the same striking force. Thus, in the case where the first to fourth divided electrodes 15a to 15d are not equal in area, the compensating table 21a is used to compensate for the different areas so that a same striking force may be detected as a same striking intensity despite the different areas. Further, the CPU 21 detects or identifies one of the first to fourth divided electrodes 15a to 15d which has output a signal of a maximum level among the signals output from the divided electrodes 15a to 15d, to thereby detect the struck position. Also, the striking intensity can be obtained by adding together the signals output from the first to fourth divided electrodes 15a to 15d.

Then, the CPU 21 gives information of the detected struck position and striking intensity to a tone generator 22. The tone generator 22 in turn reads out, from a memory 22a, tone waveform data of a tone color corresponding to the detected struck position and imparts the rear-out tone waveform data with an envelope corresponding to the detected striking intensity, to thereby generate a tone. In the memory 22a of the tone generator 22, there are prestored various tone waveform data corresponding to different types of tones and ton pitches. Note that parameters pertaining to at least one of tone factors, such as a sound type, sound volume, sound pitch and sound quality, may be allocated as necessary to a plurality of struck positions and/or a plurality of ranges of striking intensity acting on the pad 10. In this case, a tone can be generated in accordance with a struck position and/or striking intensity detected when the pad 10 has been struck and in accordance with the tone factor parameters allocated to the detected struck position and/or striking intensity. In this way, there can be obtained a tone similar to a tone generated by striking an acoustic drum. The thus-obtained tone is audibly sounded through a speaker (SP) 24 after being amplified via an amplifier 23.

Figure 6:
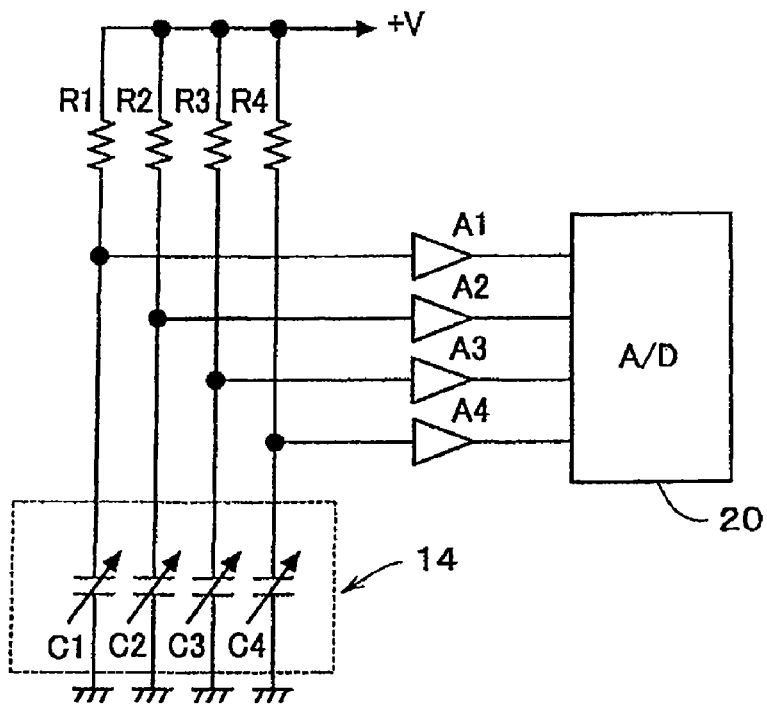
FIG. 6 is a diagram showing equivalent circuitry of the electronic percussive instrument shown in FIG. 5.

FIG. 6 is a diagram showing equivalent circuitry of the electronic percussive instrument 2 shown in FIG. 5. In FIG. 6, a section surrounded by a broken line represents an equivalent circuit of the printed circuit board 14, C1 indicates a capacitor between the movable electrode 11 and the first divided electrode 15a, C2 represents a capacitor between the movable electrode 11 and the second divided electrodes 15a and 15b, capacitance C3 represents a capacitor between the movable electrode 11 and the third divided electrode 15c, and C4 represents a capacitor between the movable electrode 11 and the fourth divided electrode 15d. In a steady state, the capacitors C1 to C4 are kept charged by the power supply +V via the respective resistors R1 to R4 connected in series with them. If the pad 10 is struck with the stick 10 so that the capacitance of the capacitor C1 greatly changes, then a potential at a connection point between the resistor R1 and the capacitor C1 decreases, and thus, the capacitor C1 will be charged via the resistor R1. Such a potential change at the connection point between the resistor R1 and the capacitor C1 is amplified as an electric signal via the first amplifier A1 and then supplied to the A/D converter 20. The level of the signal is substantially proportional to a capacitance change rate of the capacitor C1, and the stronger the pad 10 is struck with the stick 100, the greater the level of the signal output from the A/D converter.

Figure 7:
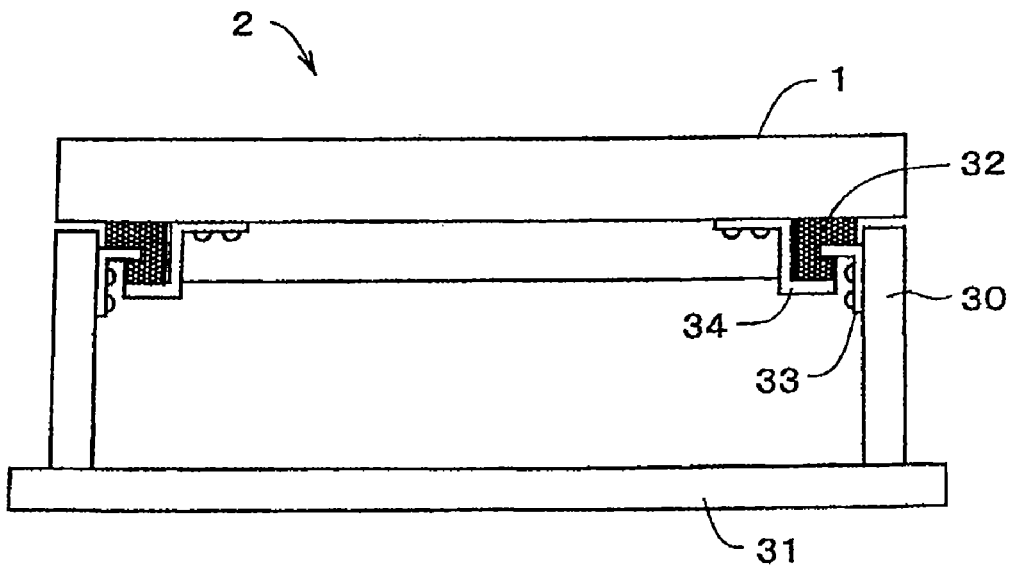
FIG. 7 is a sectional view of the electronic percussive instrument shown in FIG. 5.

FIG. 7 is a sectional view showing an example of the construction of the electronic percussive instrument 2. In the illustrated example, the electronic percussive instrument 2 is an electronic drum, in which the pressure sensor 1 is provided on an upper end portion of a cylindrical body 30 formed of wood or metal, and a cylindrical bottom plate 31 is fixed to a lower end portion of the body 30. Several L-shaped mounting members (fittings) 33 are fixed to an upper inner surface portion of the body 30 in an upside-down orientation with a horizontal upper portion of each of the L-shaped mounting members 33 projecting inward to fit in a groove formed in a ring-shaped shock absorbing member 32 formed of rubber or the like. In this case, the groove is formed in a substantial vertically-middle region of the outer surface of the ring-shaped shock absorbing member 32. Further, the shield electrode 16 forming the lowermost layer of the pressure sensor 1 is preferably a metal plate of several millimeters, and several Z-shaped mounting members (fittings) 34 are secured to the lower or underside surface of the shield electrode 16 in corresponding relation to the L-shaped mounting members 33. The shock absorbing member 32 is supported at its underside by an outwardly-projecting lower horizontal portion of the Z-shaped mounting members 34, and this shock absorbing member 32 is retained or sandwiched between the L-shaped mounting member 33 and Z-shaped mounting members 34. The body 30 and the pressure sensor 1 are supported in such a manner that the upper end edge of the body 30 and the underside surface of the pressure sensor 1 are opposed to each other with a slight space. Thus, even when the pressure sensor 1 is struck with the stick 100, the body 30 and the pressure sensor 1 are prevented, via the shock absorbing member 32, from contacting each other. In other words, through the action of the shock absorbing member 32, any impact applied to the body 30 would not transmit to the pressure sensor 1. The bottom plate 31 may be mounted on drum supporting legs, such as a drum supporting tripod stand.

Figure 8:
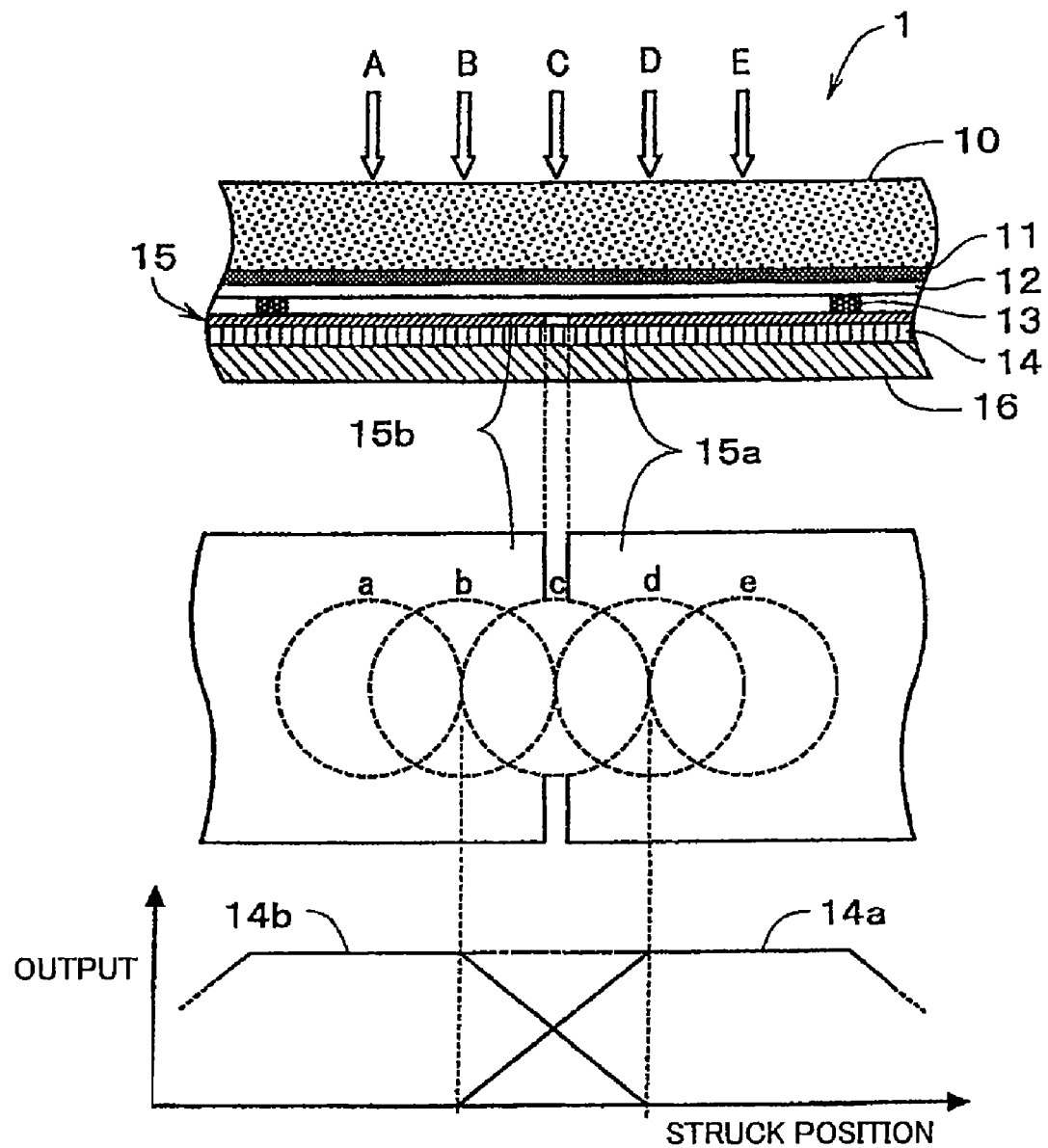
FIG. 8 is a diagram showing how a struck position and striking intensity of the first embodiment of the pressure sensor are detected.

Next, with reference to FIG. 8, a description will be given about a manner in which the CPU 21 detects a struck position and striking intensity. FIG. 8 is a fragmentary enlarged view of the pressure sensor 1, which particularly shows behavior of the pressure sensor 1 when a boundary portion between the first and second divided electrodes 15a and 15b are struck with the stick 100. Let it be assumed here that the pad 10 of the pressure sensor 1 is struck with the stick 100 at positions A, B, C, D and E in the boundary portion between the adjoining first and second divided electrodes 15a and 15b. "a", "b", "c", "d" and "e" represent portions of the movable electrode 11, located over the first and second divided electrodes 15a and 15b, which are deformed by the striking with the stick 100. Because these portions a, b, c, d and e are struck with the stick 100 having a round (generally semispherical) head, each of them is deformed into a generally circular shape. When the pad 10 is struck with the stick 100 at positions A and B, signals are output only from the second divided electrode 15b because the deformed portions a and b of the movable electrode 11 are located over (correspond to) only the second divided electrode 15b, and levels of these output signals are each proportional to the corresponding striking intensity.

Further, when the pad 10 is struck with the stick 100 at position C, signals are output from the first and second divided electrode 15a and 15b because the deformed position c of the movable electrode 11 is located substantially centrally between the first and second divided electrode 15a and 15b. Level of the output signal from each of the electrodes 15a-15d is a substantial half of an output proportional to the corresponding striking intensity because two substantial halves of the area of the deformed position c correspond to the first and second divided electrode 15a and 15b. Further, when the pad 10 is struck with the stick 100 at positions D and E, signals are output only from the first divided electrode 15a because the deformed portions d and e of the movable electrode 11 are located over (correspond to) only the first divided electrode 15a, and levels of these output signals are each proportional to the corresponding striking intensity. Graph, where the horizontal axis represents the struck position, is shown in a lowermost section of FIG. 8, from which it is seen that output signals from the first and second divided electrode 15a and 15b change in level depending on the struck positions. Let it be assume that the striking intensity does not differ among various struck positions.

As indicated in the graph, when the pad 10 is struck at a position between positions B and D, signals of levels corresponding to that position are output from the first and second divided electrode 15a and 15b. Namely, by detecting the respective levels of the signals output from the first and second divided electrode 15a and 15b, it is possible to accurately detect which position of the first and second divided electrode 15a and 15b has been struck. At that time, a sensor output signal of a level corresponding to the striking intensity can be obtained by adding together the outputs from the first and second divided electrode 15a and 15b; thus, even where there is a space between the first and second divided electrode 15a and 15b, no dead zone is produced.

The above-described first embodiment of the pressure sensor 1 can be prevented from being subjected to (or influenced by) external disturbances because the fixed electrode 15 comprising the first to fourth divided electrode 15a to 15d is vertically sandwiched between the grounded movable electrode 11 and the grounded shield electrode 16. Thus, the pressure sensor 1 can achieve an increased sensitivity and dynamic range, thereby permitting an enhanced performance expressiveness. Further, because relationship between the intensity of the striking force applied to the upper surface of the pad 10 and the amount of the deformation of the bottom surface of the pad 10 responsive to the applied striking force is constant for various different struck positions on the pad 10, relationship between the intensity of the striking force and the amount of the capacitance change is also constant for various different struck positions on the pad 10. Further, the struck position can be detected by detecting or identifying a particular one of the divided electrodes which has output a signal of a maximum level among signals output from the first to fourth divided electrodes 15a to 15d, and the striking intensity can be obtained by adding together the signals output from the first to fourth divided electrodes 15a to 15d. Thus, the instant embodiment permits simplification of necessary processing for obtaining the struck position and striking intensity. Thus, the pressure sensor 1 can achieve an increased speed of response and thereby provide sensor outputs appropriately following inputs made by the pad 10 being struck repetitively at high speed. Further, even when the pad 10 is simultaneously struck at different positions, there can be appropriately obtained outputs from the first to fourth divided electrodes 15a to 15d corresponding to the struck positions. Furthermore, it is possible to enhance the detection accuracy of the struck position by increasing the number of the divided electrodes in the fixed electrode 15.

Figure 9:
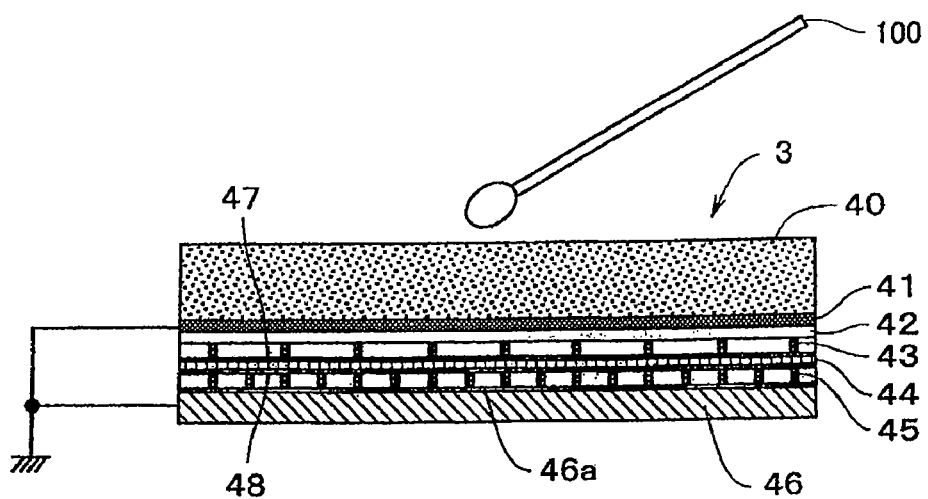
FIG. 9 is a sectional front view showing a construction of a second embodiment of the pressure sensor of the present invention.
Figure 10:
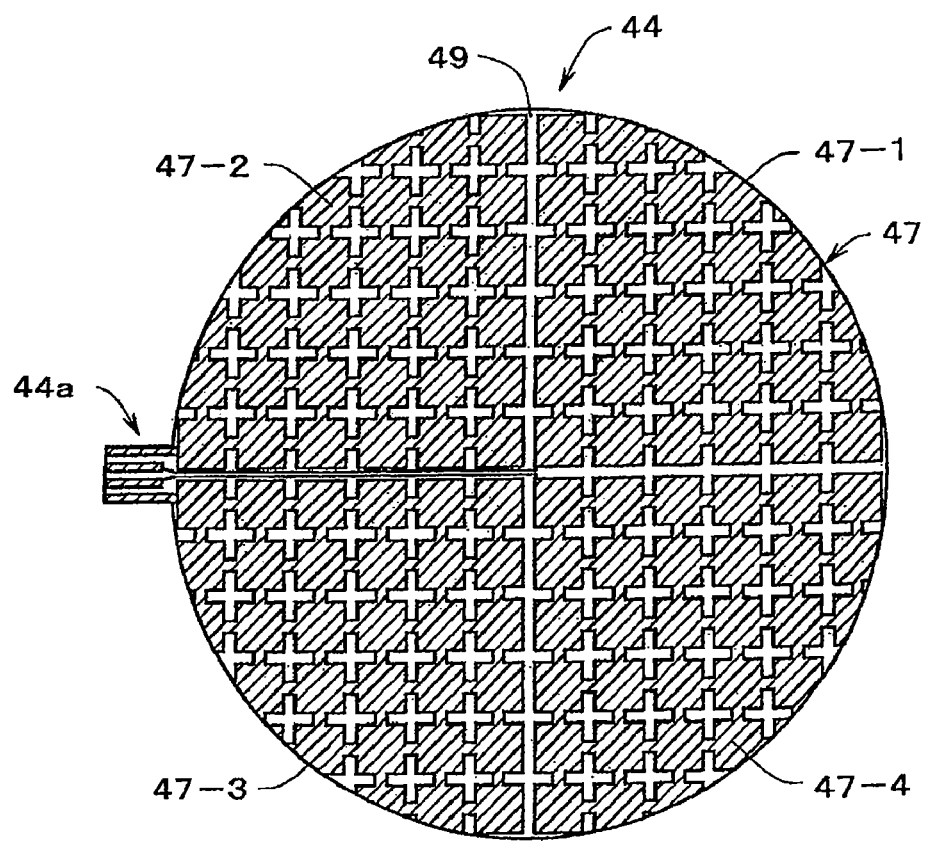
FIG. 10 is a top plan view showing a construction of a print film employed in the second embodiment of the pressure sensor.
Figure 11:
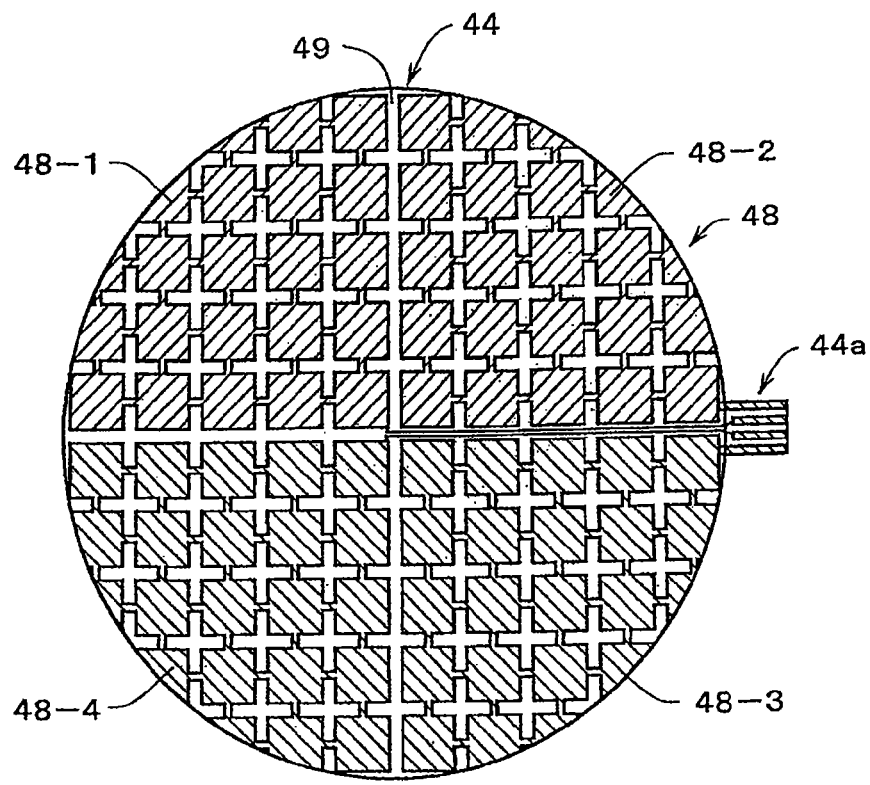
FIG. 11 is a bottom plan view showing the construction of the print film employed in the second embodiment of the pressure sensor.
Figure 12:
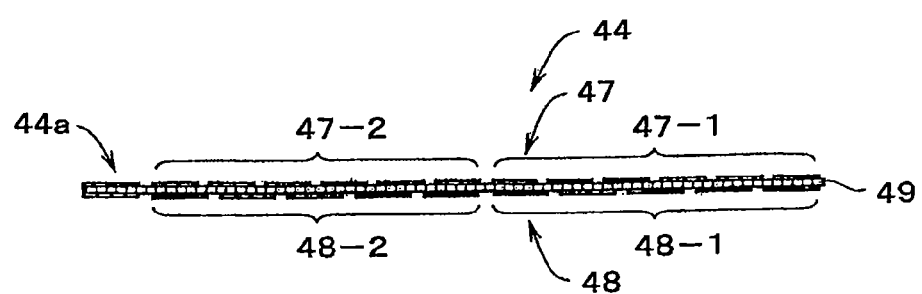
FIG. 12 is a side view showing the construction of the print film employed in the second embodiment of the pressure sensor.

FIG. 9 is a sectional front view showing a construction of a second embodiment of the pressure sensor of the present invention, FIG. 10 is a top plan view showing a construction of a print film employed in the second embodiment of the pressure sensor, and FIG. 11 is a bottom plan view showing the construction of the print film employed in the second embodiment of the pressure sensor.

The second embodiment of the pressure sensor 3 shown in FIGS. 9-11 is applied to a performance information input apparatus suited for application to an electronic percussion instrument, such as an electronic drum. On the upper surface of the second embodiment of the pressure sensor 3 is disposed a disk-shaped pad 40 that provides a striking surface for being struck with a stick 100 or the like. Preferably, the pad 40 is formed of a resilient material, such as resin foam having closed cells, so that the human player can obtain generally the same feel as when striking an acoustic drum. To the underside surface of the pad 40 is attached a thin, circular, planar-shaped resin film 42 having a first movable electrode 41 formed on its upper surface. The resin film 42 is formed of an insulting material, such as PET, and the movable electrode 41 is formed on the entire upper surface of the resin film 42 by vapor deposition or the like.

The resin film 42 is attached, via a first double-face adhesive tape 43 of a thin circular shape, to a generally circular, planar print film 44 having a second movable electrode 47 formed on its upper surface and a third movable electrode 48 formed on its underside surface. Both of the second and third movable electrodes 47, 48 are movable along with the planar print film 44. Similarly to the double-face adhesive tape 13 in the first embodiment, the first double-face adhesive tape 43 has a multiplicity of rectangular recesses formed therein at a predetermined pitch in vertical and horizontal arrays; alternatively, the rectangular recesses may be formed in the first double-face adhesive tape 43 at a predetermined pitch in a generally concentric configuration. The first double-face adhesive tape 43 is attached at its upper surface to the lower surface of the resin film 42 and attached at its underside surface to the upper surface of the print film 44 having the second movable electrode 47 formed thereon. The print film 44 comprises a film substrate 49 on which metal can be vapor-deposited. The second movable electrode 47 is formed on the obverse or upper surface of the film substrate 49 by vapor deposition or printing as shown in FIG. 10, and the third movable electrode 48 is formed on the lower or underside surface of the film substrate 49 by vapor deposition or printing as shown in FIG. 11. The second movable electrode 47 comprises four divided electrodes 47-1, 47-2, 47-3 and 47-4 angularly displaced from each other by about 90 degrees, and the third movable electrode 48 comprises four divided electrodes 48-1, 48-2, 48-3 and 48-4 angularly displaced from each other by about 90 degrees.

The divided electrodes 47-1, 47-2, 47-3 and 47-4 constituting the second movable electrode 47 are each composed of a plurality of interconnected rectangular patches. Similarly, the divided electrodes 48-1, 48-2, 48-3 and 48-4 constituting the third movable electrode 48 are each composed of a plurality of interconnected rectangular patches. The rectangular patches constituting the second movable electrode 47 and the rectangular patches constituting the third movable electrode 48 differ from each other in size and arranged pitch; namely, the rectangular patches constituting the third movable electrode 48 are greater in size and arranged pitch than the rectangular patches constituting the second movable electrode 47. Terminals for outputting signals from the divided electrodes 47-1, 47-2, 47-3 and 47-4 and terminals for outputting signals from the divided electrodes 48-1, 48-2, 48-3 and 48-4 are provided on the upper and underside surfaces, respectively, of the terminal section 44a. The divided electrodes of corresponding positions in the second movable electrode 47 and third movable electrode 48 are electrically interconnected. More specifically, the divided electrodes 47-1, 47-2, 47-3 and 47-4 are electrically connected with the divided electrodes 48-1, 48-2, 48-3 and 48-4, respectively. Such connection between the corresponding divided electrodes may be implemented, for example, by interconnecting the corresponding terminals in the terminal section 44a or by forming through-holes in the film substrate 49. The underside surface of the print film 44 is attached to a disk-shaped shield electrode 46 by means of a circular, thin second double-face adhesive tape 45. In this illustrated example, the second double-face adhesive tape 45 has a multiplicity of rectangular recesses formed therein at a predetermined pitch in vertical and horizontal arrays, similarly to the double-face adhesive tape 13 employed in the first embodiment. The rectangular recesses formed in the second double-face adhesive tape 45 are smaller in size and pitch than those formed in the first double-face adhesive tape 43. Alternatively, the rectangular recesses may be formed at a predetermined pitch in a generally concentric configuration. Insulating layer 46a for preventing short-circuiting with the third movable electrode 48 is provided on the upper surface of the shield electrode 46. The insulating layer 46a may be formed by insulating coating, painting or otherwise.

Because the print film 44 having the second movable electrode 47 formed on its upper surface and the third movable electrode 48 formed on its underside surface is sandwiched between the shield electrode 46 and the first movable electrode 41, and because the shield electrode 46 and the first movable electrode 41 are grounded, the second movable electrode 47 and the third movable electrode 48 can be shielded. In this way, no signal is output from the second movable electrode 47 and third movable electrode 48 even when a hand or the like approaches the pressure sensor 3, so that the pressure sensor 3 can be reliably resistant to external disturbances. Further, the third double-face adhesive tape 43 also functions as a spacer providing a gap or space between the first movable electrode 41 and the second movable electrode 47, to thereby provide a first capacitance element; thus, capacitance is produced between the first movable electrode 41 and the individual divided electrodes 47-1-47-4 of the second movable electrode 47. Further, the second double-face adhesive tape 45 also functions as a spacer providing a space between the third movable electrode 48 and the shield electrode 46, to thereby provide a second capacitance element; thus, capacitance is produced between the shield electrode 46 and the individual divided electrodes 48-1-48-4 of the second movable electrode 48.

The first and second double-face adhesive tapes 43 and 45 each have a thickness of about 170 μm, and the rectangular recesses formed in the first double-face adhesive tape 43 are greater in size than those formed in the second double-face adhesive tape 45. Further, the rectangular patches constituting the second movable electrode 47 each have a size of about 8 mm×8 mm and are provided in such a manner that a pitch between the centers of every adjoining pair of the rectangular patches measuring about 10 mm. The rectangular patches constituting the third movable electrode 48 each have a size of about 18 mm×18 mm and are provided in such a manner that the pitch between the centers of every adjoining pair of the rectangular patches measuring about 20 mm. Namely, the rectangular recesses of the first double-face adhesive tape 43 in the first capacitance element are relatively great in size and the rectangular patches of the second movable electrode 47 are relatively small in size, so that the first capacitance element has a relatively small rigidity against an applied pressure. Further, the rectangular recesses of the second double-face adhesive tape 45 in the second capacitance element are relatively small in size and the rectangular patches of the third movable electrode 48 are relatively large in size, so that the second capacitance element has a relatively great rigidity against an applied pressure. Namely, the first capacitance element has a smaller rigidity than the second capacitance element for a reason to be explained later. Note that, in each of the figures showing the second embodiment of the pressure sensor 3, the thicknesses (heights) of the various components are shown as enlarged or exaggerated as compared to their real thicknesses (heights) to facilitate understanding.

Figure 13:
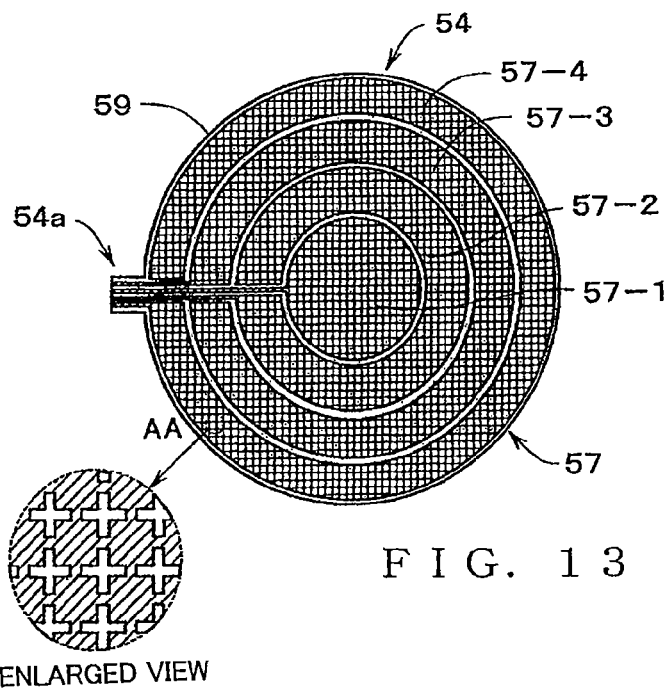
FIG. 13 is a top plan view showing a modification of the print film employed in the second embodiment of the pressure sensor.
Figure 14:
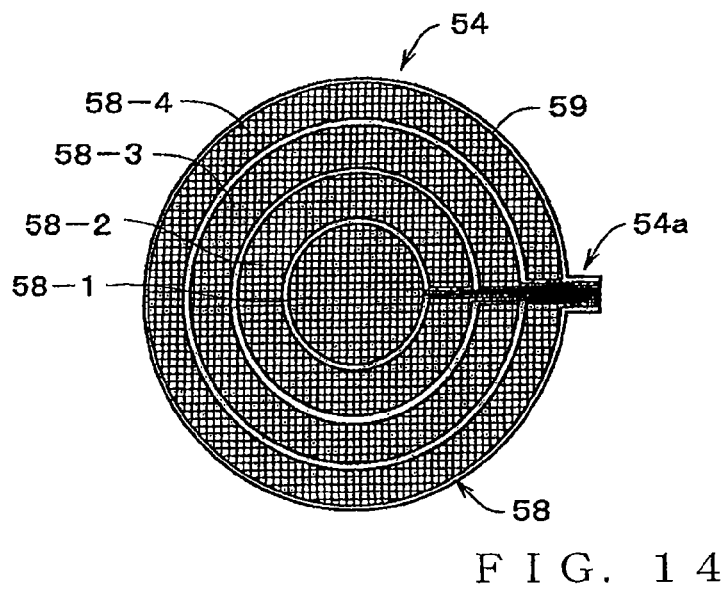
FIG. 14 is a bottom plan view of the modified print film of FIG. 13.
Figure 15:
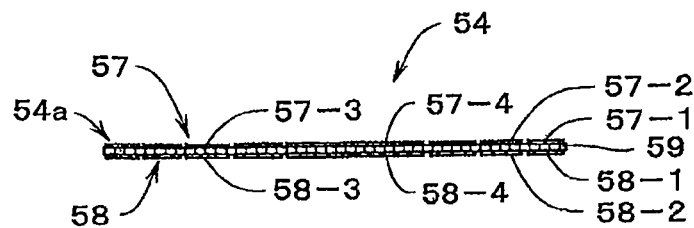
FIG. 15 is a side view of the modified print film of FIG. 13.

FIGS. 13 to 15 show a modification of the print film 44 employed in the second embodiment of the pressure sensor 3. More specifically, FIG. 13 is a top plan view showing the upper surface of the modified print film 54, FIG. 14 is a bottom plan view showing the underside surface of the modified print film 54, and FIG. 15 is a side view of the modified print film 54.

As shown in these figures, a second movable electrode 57, comprising four ring-shaped divided electrodes 57-1, 57-2, 57-3 and 57-4, is formed on the upper surface of a film substrate 59 by printing or etching, and a third movable electrode 58, comprising four ring-shaped divided electrodes 58-1, 58-2, 58-3 and 58-4, is formed on the underside surface of the film substrate 59 by printing or etching. The ring-shaped divided electrodes of corresponding positions in the second movable electrode 57 and third movable electrode 58 are formed in same shapes and same sizes; that is, the ring-shaped divided electrodes 57-1, 57-2, 57-3 and 57-4 of the second movable electrode 57 are identical in shape and size to the ring-shaped divided electrodes 58-1, 58-2, 58-3 and 58-4, respectively, of the third movable electrode 58. As shown in an enlarged section AA of FIG. 13, each of the electrodes is constructed of a plurality of interconnected rectangular patches. Terminals for outputting signals from the ring-shaped divided electrodes 57-1-57-4 and terminals for outputting signals from the ring-shaped divided electrodes 58-1-58-4 are provided on the upper and underside surfaces, respectively, of a terminal section 54a. The ring-shaped divided electrodes of the corresponding positions in the second movable electrode 57 and third movable electrode 58 are electrically interconnected. More specifically, the divided electrodes 57-1, 57-2, 57-3 and 57-4 are connected with the divided electrodes 58-1, 58-2, 58-3 and 58-4, respectively. Such connection between the corresponding divided electrodes may be implemented, for example, by interconnecting the corresponding terminals in the terminal section 54a or by forming through-holes in a film substrate 59. It is preferable that corresponding pairs of the ring-shaped divided electrodes 57-1, 57-2, 57-3 and 57-4 and ring-shaped divided electrodes 58-1, 58-2, 58-3 and 58-4 8 be equal in size or area as noted above, but, if the corresponding pairs can not be formed equal in size, a compensating table is used for compensating for the different areas of the divided electrodes.

Figure 16:
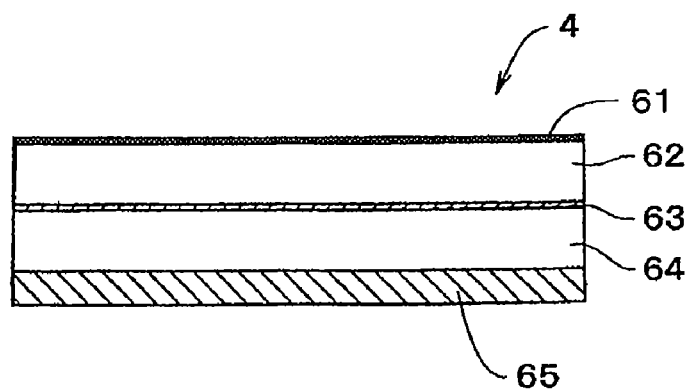
FIG. 16 is a sectional front view showing a construction of a third embodiment of the pressure sensor of the present invention.

FIG. 16 is a sectional front view showing a construction of a third embodiment of the pressure sensor of the present invention. The third embodiment of the pressure sensor 4 has a circular or rectangular outline, and a first movable electrode 61, which is grounded, is disposed on the upper surface of the pressure sensor 4. More specifically, the first movable electrode 61 is formed on the entire upper surface of a first spacer 62 by pasting, vapor deposition or otherwise. Second movable electrode 63 functioning as an output electrode is disposed on the underside surface of the first spacer 62 and formed on the entire upper surface of a second spacer 64 by pasting, vapor deposition or otherwise. Conductive shield electrode 65 formed, for example, of metal is attached to the underside surface of the second spacer 64, and this shield electrode 65 is grounded similarly to the first movable electrode 61. The first spacer 62 having the first movable electrode 61 formed on its upper surface is attached at its underside surface to the upper surface of the second movable electrode 63. Further, the first spacer 62 and second spacer 64, which are formed of flexible elastomer, porous soft sponge or the like, may be constructed to have different hardness. In the third embodiment of the pressure sensor 4, the first spacer 62 is a soft spacer, while the second spacer 64 is harder than the first spacer 62. Further, in the third embodiment of the pressure sensor 4, a first capacitance element is constructed of the first and second movable electrodes 61 and 63 opposed to each other via the first spacer 62, and a second capacitance element is constructed of the second movable electrode 63 and shield electrode 65 opposed to each other via the second spacer 64. The first capacitance element which also functions as a soft spacer has a relatively small rigidity, while the second capacitance element which also functions as a hard spacer has a relatively great rigidity.

Figure 17:
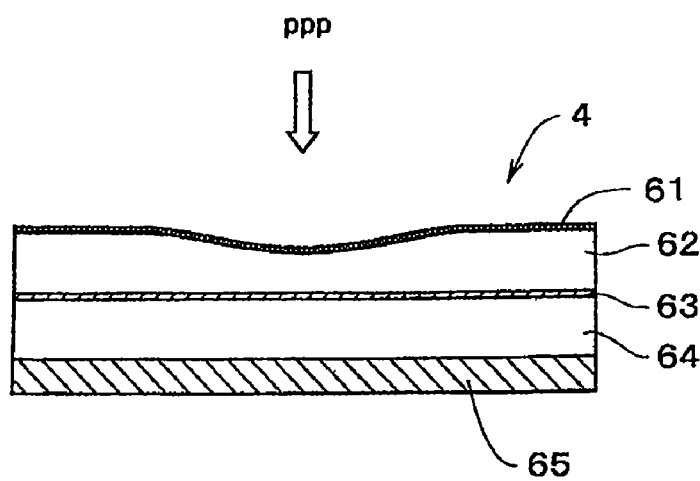
FIG. 17 is a view explanatory of how the third embodiment of the pressure sensor behaves when an extremely small pressure is applied thereto.

When an extremely small pressure (e.g., pressure corresponding to a musical sign "ppp") is applied to the upper surface of the third embodiment of the pressure sensor 4 as shown in FIG. 17, a portion of the first movable electrode 61 to which the pressure has been applied slightly flexes downward, in response to which the soft first spacer 62 too flexes downward. Consequently, a gap or space between the first movable electrode 61 having flexed downward and the second movable electrode 63 decreases, so that the capacitance of the first capacitance element between the first movable electrode 61 and the second movable electrode 63 changes and thus an output signal of a level corresponding to the capacitance change rate of the first capacitance element is output from the second movable electrode 63. In this case, the capacitance of the second capacitance element remains unchanged, and thus, no output signal corresponding to a capacitance change of the second capacitance element is output.

Figure 18:
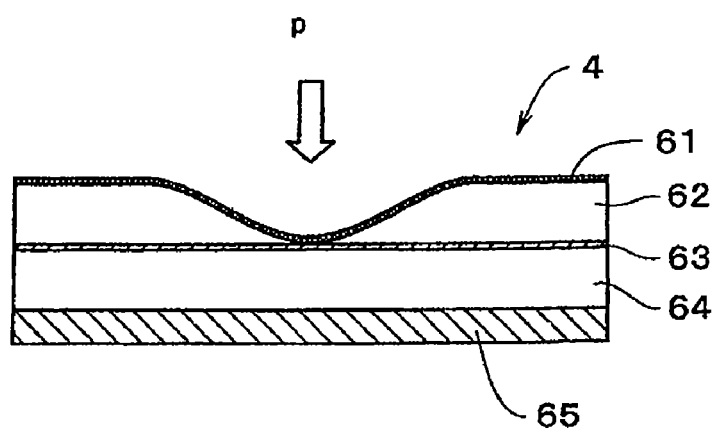
FIG. 18 is a view explanatory of how the third embodiment of the pressure sensor behaves when a small pressure is applied thereto.

Further, when a small pressure (e.g., pressure corresponding to a musical sign "p") is applied to the upper surface of the third embodiment of the pressure sensor 4 as shown in FIG. 18, a portion of the first movable electrode 61 to which the pressure has been applied flexes more downward than in FIG. 17, in response to which the first spacer 62 too flexes downward. Consequently, the space between the first movable electrode 61 having flexed downward and the second movable electrode 63 is minimized, so that the capacitance change rate of the first capacitance element is maximized and thus an output signal of a maximum level corresponding to the capacitance change rate of the first capacitance element is output from the second movable electrode 63; namely, the output of the first capacitance element will saturate. In this case, the capacitance of the second capacitance element remains unchanged, and thus, no output signal corresponding to a capacitance change of the second capacitance element is output.

Figure 19:
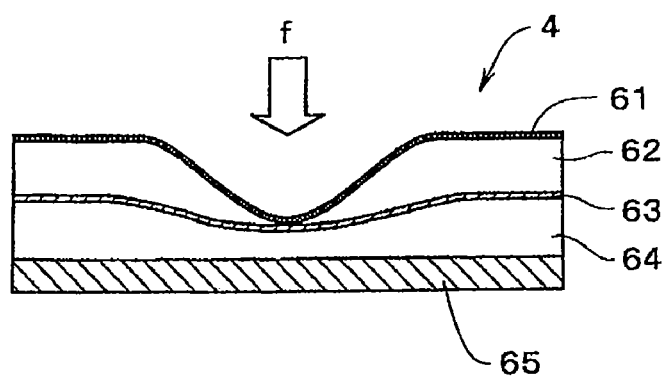
FIG. 19 is a view explanatory of how the third embodiment of the pressure sensor behaves when a great pressure is applied thereto.

Further, when a great pressure (e.g., pressure corresponding to a musical sign "f") is applied to the upper surface of the third embodiment of the pressure sensor 4 as shown in FIG. 19, a portion of the first movable electrode 61 to which the pressure has been applied flexes even more downward, in response to which the first spacer 62 too flexes downward. In this case, the first movable electrode 61 and first spacer 62 flex further downward even after the space between the first movable electrode 61 and the second movable electrode 63 is minimized, so that a portion of the second movable electrode 63 too flexes downward. Thus, the hard second spacer 64 too flexes downward. Consequently, an output signal of a maximum level corresponding to the capacitance change rate of the first capacitance element is output from the second movable electrode 63. In this case, however, an output signal of a level corresponding to a rate of a capacitance change of the second capacitance element resulting from a decreased space between the second movable electrode 63 having flexed and the shield electrode 65 is added to the output signal corresponding to the capacitance change rate of the first capacitance element, and the resultant sum of the output signals is output from the second movable electrode 63.

Figure 20:
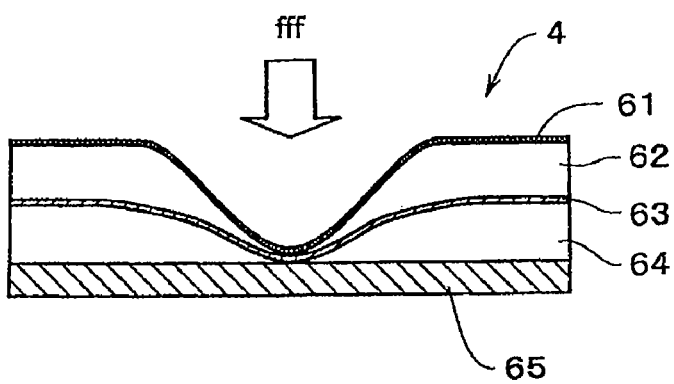
FIG. 20 is a view explanatory of how the third embodiment of the pressure sensor behaves when an extremely great pressure is applied thereto.

Furthermore, when an extremely great pressure (e.g., pressure corresponding to a musical sign "fff") is applied to the upper surface of the third embodiment of the pressure sensor 4 as shown in FIG. 20, a portion of the first movable electrode 61 to which the pressure has been applied flexes even more downward, in response to which the first spacer 62 too flexes even more downward. In this case, the first movable electrode 61 and first spacer 62 flex further downward even after the space between the first movable electrode 61 and the second movable electrode 63 is minimized, so that a portion of the second movable electrode 63 too flexes downward. Thus, the hard second spacer 64 too flexes even more downward. In this case, the space between the second movable electrode 63 having flexed and the shield electrode 65 is minimized. Consequently, the capacitance change rate of the second capacitance element is maximized, so that an output signal of a maximum level corresponding to the capacitance change rate of the second capacitance element is output from the second movable electrode 63. Namely, the output from the second capacitance element will saturate. In this case, because the output of the first capacitance element has already saturated, the output signal of the maximum level corresponding to the capacitance change rate of the second capacitance element is added to the output signal of the maximum level corresponding to the capacitance change rate of the first capacitance element, and the resultant sum of the output signals is output from the second movable electrode 63.

Figure 21:
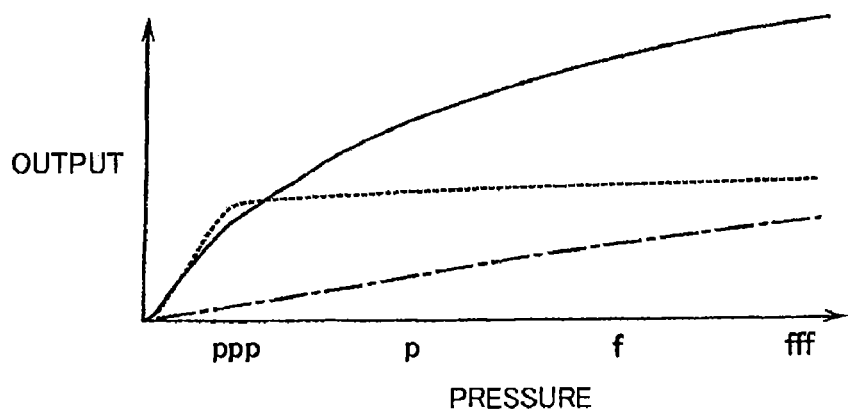
FIG. 21 is a diagram showing output characteristics of the third embodiment of the pressure sensor.
Figure 25:
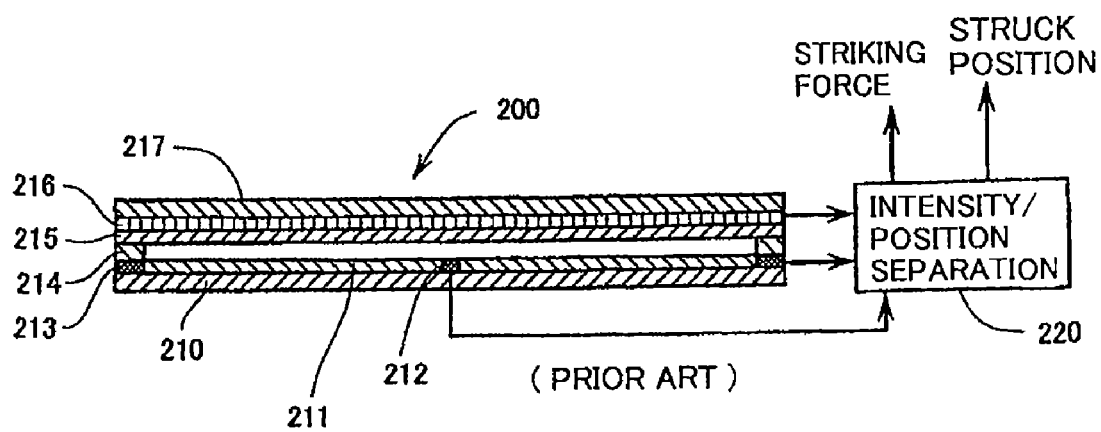
FIG. 25 is a sectional view of an example of a pressure sensor employed in a conventionally-known electronic percussion instrument.
Figure 26:
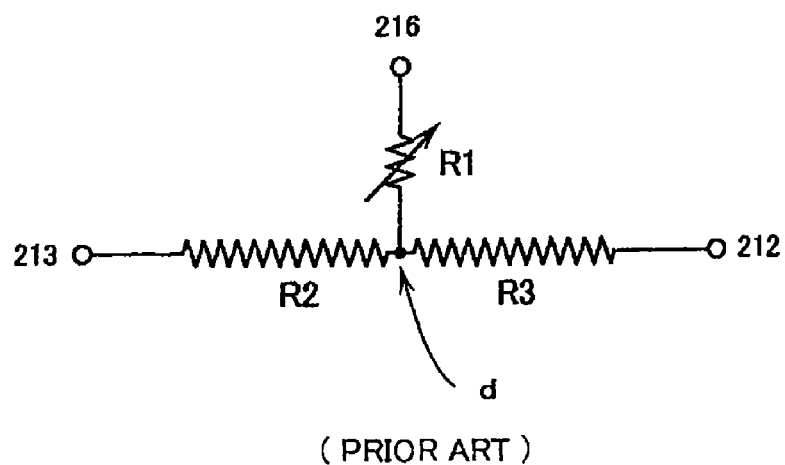
FIG. 26 is a diagram showing equivalent circuitry of the pressure sensor of FIG. 25.

FIG. 21 shows output characteristics of the third embodiment of the pressure sensor 4 responsive to the pressure applied thereto. In FIG. 21, a broken line represents an output characteristic of the first capacitance element, from which it can be seen that, even when an extremely small pressure is applied, the first capacitance element can provide a relatively great output and achieve an increased sensitivity because the first spacer 62 is a soft spacer having a small rigidity. However, in this case, the output would undesirably saturate although the applied pressure is small. Further, a one-dot-dash line represents an output characteristic of the second capacitance element, from which it can be seen that, even when various different pressure from an extremely small pressure to an extremely great pressure is applied, the second capacitance element pressure sensor 4 can provide a generally linear output in response to the applied pressure because the second spacer 64 is a hard spacer having a great rigidity. However, in this case, the second capacitance element can achieve only a low sensitivity. Further, a solid line represents an output characteristic of the third embodiment of the pressure sensor 4 provided with the first and second capacitance elements; namely, the pressure sensor 4 presents a combination of the output characteristics of the first and second capacitance elements. More specifically, the pressure sensor 4 can not only provide a relatively great output and achieve an increased sensitivity even when the applied pressure is extremely small, but also provide an output corresponding to the applied pressure without the output saturating even when the applied pressure ranges from an extremely small pressure to an extremely great pressure. In other words, the pressure sensor 4 can operate as a high-sensitivity pressure sensor with an even further increased dynamic range. Besides, because the second movable electrode 63, which is an output electrode, is sandwiched between the grounded first movable electrode 61 and the grounded shield electrode 65, the pressure sensor 4 can be prevented from being influenced by external disturbances despite, the enhanced sensitivity.

Because the first capacitance element has a smaller rigidity than the second capacitance element in the second embodiment of the pressure sensor 3, the second embodiment of the pressure sensor 3 can provide pressure-output characteristics similar to those provided by the third embodiment of the pressure sensor 4. Namely, in the second embodiment of the pressure sensor 3, if small pressure is applied to the first movable electrode 41, only the first movable electrode 41 is displaced with the small pressure, while if great pressure is applied to the first movable electrode 41, all of the first to third movable electrode 41, 47 and 48 are displaced with the great pressure. Accordingly, the pressure sensor 3 according to the second embodiment too can not only provide a relatively great output and achieve an increased sensitivity even when the applied pressure is extremely small, but also provide an output corresponding to the applied pressure without the output saturating even when the applied pressure ranges from an extremely small, pressure to an extremely great pressure. Thus, the pressure sensor 3 too can operate as a high-sensitivity pressure sensor with an even further increased dynamic range. Besides, because the second movable electrode 47, which is an output electrode, is sandwiched between the grounded first movable electrode 41 and the grounded shield electrode 46, the pressure sensor 3 can be prevented from being influenced by external disturbances despite the enhanced sensitivity.

Note that, in the case where the second embodiment of the pressure sensor 3 or the third embodiment of the pressure sensor 4 is applied to a performance information input apparatus for an electronic percussion instrument, such as an electronic drum, the dynamic range of the output signal can be even further increased and performance expressiveness can be even further enhanced because capacitance changes of the first and second capacitance elements responsive to striking intensities are used in the embodiment.

In the case where the second embodiment of the pressure sensor 3 is applied to an electronic percussion instrument, the electronic percussion instrument is constructed in generally the same manner as shown in FIG. 5. In the pressure sensor 3, where the terminal section 44a has four output terminals provided on each of the upper and underside surfaces thereof, only four amplifiers and four pull-up resistors have to be provided because the divided electrodes of the corresponding positions in the second and third movable electrodes 47 and 48 are connected in parallel. Further, the A/D converter 4 converts four signals into digital signals, so as to detect a signal of a maximum level among signals output from the parallel-connected divided electrodes 47-1-47-4 and 48-1-48-4 and thereby detect the struck position on the pad. In this case, even when the struck position is in a boundary portion between two of the divided electrodes, the struck position can be detected accurately in the manner as shown and described in FIG. 8. Further, a signal of a level corresponding to the striking intensity can be provided by adding together the signals output from all of the divided electrodes of the second and third movable electrodes 47 and 48.

Further, in the case where the second embodiment of the pressure sensor 3 is applied to an electronic percussion instrument, the electronic percussion instrument may be mechanically constructed in generally the same manner as shown in FIG. 7, except that the pressure sensor 3 replaces the pressure sensor 1 of FIG. 7. Further, a different musical instrument may be assigned to each of the divided electrodes of the second and third movable electrodes 47 and 48 so that performance information of a plurality of musical instruments can be input via the pressure sensor 3.

As a modification, the third embodiment of the pressure sensor 4 may be provided with two output electrodes similarly to the second embodiment of the pressure sensor 3. FIG. 22 is a sectional front view showing a construction of such a modified pressure sensor 5 provided with two output electrodes. The modified pressure sensor 5 includes the grounded first movable electrode 61 provided on the upper surface thereof. More specifically, the first movable electrode 61 is formed on the entire upper surface of the first spacer 62 by pasting, vapor deposition or otherwise. The second movable electrode 63 functioning as an output electrode, which is disposed on the underside surface of the first spacer 62, is formed on the entire upper surface of a print film 66 by pasting, vapor deposition or otherwise. The print film 66 is a resin film formed of PET or the like, and a third movable electrode 67 is formed on the entire underside surface by pasting, vapor deposition or otherwise. The second spacer 64 is attached at its upper surface to the underside surface of the third movable electrode 67, and the conductive shield electrode 65 formed, for example, of metal is attached to the underside surface of the second spacer 64. The shield electrode 65 is grounded similarly to the first movable electrode 61.

Further, in the modified pressure sensor 5, the first and second spacers 62 and 64, which are formed of flexible elastomer, porous soft sponge or the like, may be constructed to have different hardness. In the modification 5 of the third embodiment too, the first spacer 62 is a soft spacer, while the second spacer 64 is harder than the first spacer 62. Further, in the modified pressure sensor 5, a first capacitance element is constructed of the first and second movable electrodes 61 and 63 opposed to each other via the first spacer 62, and a second capacitance element is constructed of the third movable electrode 67 and shield electrode 65 opposed to each other via the second spacer 64. The first capacitance element which also functions as a soft spacer has a relatively small rigidity, while the second capacitance element which also functions as a hard spacer has a relatively great rigidity.

The modified pressure sensor 5 constructed in the above-described manner too can provide pressure-output characteristics similar to those provided by the third embodiment of the pressure sensor 4 (see the solid line of FIG. 21). Namely, the modified pressure sensor 5 too can be a high-sensitivity pressure sensor with an even further increased dynamic range. Besides, because the second and third movable electrodes 63 and 67, each of which is an output electrode, are sandwiched between the grounded first movable electrode 61 and the grounded shield electrode 65, the modified pressure sensor 5 can be prevented from being influenced by external disturbances despite the enhanced sensitivity.

FIG. 23 is a sectional front view showing a fourth embodiment of the pressure sensor 6 of the invention which is constructed in a generally similar manner to the third embodiment of the pressure sensor 4 and capable of detecting a pressure-applied position, and FIG. 24 is a top plan view showing a construction of a second spacer 74 employed in the fourth embodiment of the pressure sensor 6.

The fourth embodiment of the pressure sensor 6 shown in these figures has a grounded first movable electrode 71 provided on the upper surface thereof, and the first movable electrode 71 is formed on the entire upper surface of a first spacer 72 by pasting, vapor deposition or otherwise. Second movable electrode 73, functioning as an output electrode, is disposed on the underside surface of the first spacer 72. The second movable electrode 73 is a patch electrode comprising a multiplicity of patch electrodes formed, in a matrix configuration, on the entire upper surface of a second spacer 74 by pasting, vapor deposition or otherwise. For example, the second movable electrode 73 comprises sixteen (4×4) patch electrodes m11, m12, m13, . . . , m44, and respective terminals of the sixteen patch electrodes m11-m44 are drawn out from the second spacer 74, eight terminals from each of the left and right sides of the second spacer 74. Namely, as shown in FIG. 24, terminals c11, c12, c21, c42 are provided on the left side of the second spacer 74, while terminals c14, c13, c24, . . . , c43 are provided on the right side of the second spacer 74.

Conductive shield electrode 75 formed, for example, of metal is attached to the underside surface of the second spacer 74. The shield electrode 75 is grounded similarly to the first movable electrode 71. The first spacer 72 having the first movable electrode 71 formed on its upper surface is attached at its underside surface to the upper surface of the second movable electrode 73. Further, the first spacer 72 and second spacer 74, which are formed of flexible elastomer, porous soft sponge or the like, may have different hardness. In the fourth embodiment of the pressure sensor 6, the first spacer 72 is a soft spacer, while the second spacer 74 is harder than the first spacer 72. Further, in the fourth embodiment of the pressure sensor 6, a first capacitance element is constructed of the first movable electrodes 71 and each one of the patch electrodes m11, m12, m13, . . . , m44 of the second 73 opposed to each other via the first spacer 72, and a second capacitance element is constructed of each one of the patch electrodes m11, m12, m13, . . . , m44 of the second movable electrode 73 and shield electrode 75 opposed to each other via the second spacer 74. A group of the first capacitance elements which also functions as a soft spacer has a relatively small rigidity, while a group of the second capacitance elements which also functions as a hard spacer has a relatively great rigidity.

When the fourth embodiment of the pressure sensor 6 constructed in the above-described manner is operated to apply a pressure to a predetermined position of the pad, a detection is made of a terminal outputting a signal of a maximum level from among the terminals c11-c44 outputting respective signals of the patch electrodes m11-m44. In this case, because one of the patch electrodes m11-m44 which is disposed at a position corresponding to the pressure-applied position outputs a signal of a greater level than the other patch electrodes, it is possible to detect the pressure-applied position from the detected patch electrode. Further, a signal of a level corresponding to the striking intensity can be provided by adding together the outputs of all of the terminals c11-c44. Further, it is possible to accurately detect to which position between the patch electrodes the pressure has been applied, using the scheme explained above with reference to FIG. 8. Furthermore, the fourth embodiment of the pressure sensor 6 too can provide pressure-output characteristics similar to those provided by the third embodiment of the pressure sensor 4 (see the solid line of FIG. 21). Namely, the pressure sensor 6 too can be a high-sensitivity pressure sensor with an even further increased dynamic range. Besides, because the second movable electrode 73, which is an output electrode, is sandwiched between the grounded first movable electrode 71 and the grounded shield electrode 75, the pressure sensor 6 can be prevented from being influenced by external disturbances despite the enhanced sensitivity. Note that, in the case where the fourth embodiment of the pressure sensor 6 is applied to a performance information input apparatus for an electronic percussion instrument, such as an electronic drum, it is possible to not only detect a struck position but also provide an output corresponding to a striking force.

Whereas the pressure sensor of the present invention has been described above as being provided with one or two capacitance elements, the present invention may be constructed as a pressure sensor with three or more capacitance elements by increasing the number of the movable electrodes. Further, because each of the capacitance elements has the movable electrode that flexes in response to an applied pressure, an operation output corresponding to a force with which the movable electrode has been depressed by a user's finger or the like can be provided in the case where a data input apparatus of the present invention employing the pressure sensor of the present invention is applied as an input apparatus for a game machine or for a controller connected to the game machine. Further, in the case where the data input apparatus of the present invention employing the pressure sensor of the present invention is applied to a performance information input apparatus for an electronic percussion instrument, such as an electronic drum, there can be provided a performance operation output corresponding to a striking force with which the movable electrode has been struck. Note that a cover or pad may be provided for protecting the upper surface of the pressure sensor of the present invention.

Further, in the case where the divided electrodes are ring-shaped divided electrodes, the number of the ring-shaped divided electrodes may be chosen as desired. The detecting accuracy of the struck position can be enhanced by increasing the number of the ring-shaped divided electrodes. Further, in the case where the divided electrodes are ones angularly displaced about the center of the sensor, they may be displaced from each other by a desired angle, and the number of the divided electrodes may be chosen as desired.

Furthermore, in the pressure sensor and data input apparatus of the present invention, a different musical instrument may be assigned to each of the divided electrodes, to achieve a multi-pad arrangement.

Furthermore, the pressure sensor and data input apparatus of the present invention may be constructed in a rectangular shape rather than being limited to a circular shape. If the pressure sensor of the present invention is constructed in a rectangular shape, it is more readily applicable to game machines, controllers of game machines and data input apparatus of a multi-pad type etc.

This application is based on, and claims priority to, JP PA 2007-321952 filed on 13 Dec. 2007 and JP PA 2007-321953 filed on 13 Dec. 2007. The disclosure of the priority applications, in its entirety, including the drawings, claims, and the specification thereof, is incorporated herein by reference.

What is claimed is:

1. A pressure sensor comprising:
a grounded, planar movable electrode;
a planar fixed electrode having one surface opposed to said movable electrode with a predetermined space interposed therebetween, said movable electrode and said fixed electrode together constituting a capacitance element; and
a grounded shielding conductor opposed to another surface of said fixed electrode with a predetermined space interposed therebetween,
wherein, as a pressure is applied to said movable electrode, capacitance of the capacitance element is changed with displacement of said movable electrode, and a signal corresponding to the pressure is output from said fixed electrode on the basis of the capacitance of the capacitance element.

2. The pressure sensor as claimed in claim 1 wherein said fixed electrode comprises a plurality of divided electrodes, and a signal is output from at least one of the divided electrodes.

3. The pressure sensor as claimed in claim 1 which further comprises a resilient pad disposed outside of said movable electrode, and a pressure is applied to the pad with a performance operating member.

4. The pressure sensor as claimed in claim 1 wherein said movable electrode is provided on an upper surface of a flexible insulating member, and which further comprises a spacer disposed between an underside surface of the insulating member and said fixed electrode, said spacer having a plurality of recesses formed therein at a predetermined pitch.

5. The pressure sensor as claimed in claim 2 wherein said plurality of divided electrodes are provided on an upper surface of an insulating board, and said shielding conductor is provided on an underside surface of the insulating board.

6. The pressure sensor as claimed in claim 2 wherein said plurality of divided electrodes are each pulled up via a passive element.

7. The pressure sensor as claimed in claim 5 wherein said plurality of divided electrodes provided on the upper surface of the insulating board are ring-shaped electrodes arranged in a concentric configuration.

8. A data input apparatus constructed to input operation information in response to operation of a pressure sensor as recited in claim 1.

9. A pressure sensor comprising:
a grounded, planar, first movable electrode;
a planar, second movable electrode having one surface opposed, via a first flexible spacer, to said first movable electrode, the first and second movable electrodes together constituting a first capacitance section; and
a grounded shielding conductor opposed, via a second flexible spacer, to another surface of said second movable electrode, said second movable electrode and said shielding conductor together constituting a second capacitance element,
wherein, as a pressure is applied to said first movable electrode, only the first movable electrode or both of the first and second movable electrodes are displaced to change capacitance of only the first capacitance element or both of the first and second capacitance elements, and a signal corresponding to the pressure applied to said first movable electrode is output from said second movable electrode on the basis of the capacitance of the first capacitance element and the second capacitance element.

10. The pressure sensor as claimed in claim 9 wherein the first capacitance element and the second capacitance element are constructed to differ from each other in rigidity against an applied pressure.

11. The pressure sensor as claimed in claim 10 wherein the first capacitance element and the second capacitance element are constructed to differ from each other in rigidity against an applied pressure by forming the first and second spacers to have different hardness.

12. The pressure sensor as claimed in claim 10 wherein the first flexible spacer and the second flexible spacer each have a plurality of recesses formed therein at a predetermined pitch, and the first capacitance element and the second capacitance element are constructed to differ from each other in rigidity against an applied pressure by differentiating the pitch of the recesses between said first flexible spacer and said second flexible spacer.

13. The pressure sensor as claimed in claim 11 wherein the rigidity against an applied pressure of the first capacitance element is smaller than the rigidity against an applied pressure of the second capacitance element.

14. The pressure sensor as claimed in claim 12 wherein the rigidity against an applied pressure of the first capacitance element is smaller than the rigidity against an applied pressure of the second capacitance element.

15. A data input apparatus constructed to input operation information in response to operation of a pressure sensor as recited in claim 9.

16. A pressure sensor comprising:
a grounded, planar, first movable electrode;
a second movable electrode provided on a surface of a planar, flexible insulating member and opposed to said first movable electrode via a first flexible spacer, the first movable electrode and the second movable electrode together constituting a first capacitance element;
a third movable electrode provided on an underside surface of the insulating member; and
a grounded shielding conductor opposed, via a second flexible spacer, to said third movable electrode, said third movable electrode and said shielding conductor together constituting a second capacitance element,
wherein, as a pressure is applied to said first movable electrode, only the first movable electrode or all of the first, second and third movable electrodes are displaced to change capacitance of only the first capacitance element or both of the first and second capacitance elements, and a first signal is output from said second movable electrode on the basis of the capacitance of the first capacitance element while a second signal is output from said third movable electrode on the basis of the capacitance of the second capacitance element, the first and second signals being added together so that a sum of the first and second signals is output.

17. The pressure sensor as claimed in claim 16 wherein the first capacitance element and the second capacitance element are constructed to differ from each other in rigidity against an applied pressure.

18. The pressure sensor as claimed in claim 17 wherein the first capacitance element and the second capacitance element are constructed to differ from each other in rigidity against an applied pressure by forming the first and second spacers to have different hardness.

19. The pressure sensor as claimed in claim 17 wherein the first flexible spacer and the second flexible spacer each have a plurality of recesses formed therein at a predetermined pitch, and the first capacitance element and the second capacitance element are constructed to differ from each other in rigidity against an applied pressure by differentiating the pitch of the recesses between said first flexible spacer and said second flexible spacer.

20. The pressure sensor as claimed in claim 18 wherein the rigidity against an applied pressure of the first capacitance element is smaller than the rigidity against an applied pressure of the second capacitance element.

21. The pressure sensor as claimed in claim 19 wherein the rigidity against an applied pressure of the first capacitance element is smaller than the rigidity against an applied pressure of the second capacitance element.

22. A data input apparatus constructed to input operation information in response to operation of a pressure sensor as recited in claim 16.

23. A pressure sensor comprising:
a planar movable electrode; and
a planar fixed electrode opposed to said movable electrode with a predetermined space interposed therebetween and having a plurality of divided electrodes, said movable electrode and each of said plurality of divided electrodes together constituting a capacitance element,
wherein, as a pressure is applied to said movable electrode to displace said movable electrode, signals output from said plurality of divided electrodes on the basis of capacitance of the capacitance element are added together so that a sum of the signals is output as a sensor output signal indicative of intensity of the pressure, and position information indicative of a position of a particular one of the divided electrodes which has output a signal of a maximum level among the signals output from said plurality of divided electrodes is output as pressure-applied-position information indicating a position of said movable electrode to which the pressure has been applied.

24. The pressure sensor as claimed in claim 23 wherein, when two signals are output from two adjoining ones of the divided electrodes, a position in a boundary portion between the two adjoining divided electrodes is calculated in accordance with respective levels of the two signals, and the calculated position in the boundary portion is output as the pressure-applied-position information indicating the position of said movable electrode to which the pressure has been applied.

25. The pressure sensor as claimed in claim 23 wherein, where a tone corresponding to the sensor output signal and the pressure-applied-position information is generated by a tone generator section, tones of different musical instruments are generated by the tone generator section in correspondence with respective position information of said plurality of divided electrodes.

26. The pressure sensor as claimed in claim 24 wherein, where a tone corresponding to the sensor output signal and the pressure-applied-position information is generated by a tone generator section, tones of different musical instruments are generated by the tone generator section in correspondence with respective position information of said plurality of divided electrodes.

27. A data input apparatus constructed to input operation information in response to operation of a pressure sensor as recited in claim 23.

28. A pressure sensor comprising:
a planar first movable electrode;
a planar second movable electrode having one surface opposed to said first movable electrode via a first flexible spacer and having a plurality of patch electrodes, said first movable electrode and each of said plurality of patch electrodes together constituting a first capacitance element; and
a conductor opposed, via a second flexible spacer, to another surface of said second movable electrode and connected with said first movable electrode, said each of said plurality of patch electrodes of said second movable electrode and said conductor together constituting a second capacitance element,
wherein, as a pressure is applied to said first movable electrode, only the first movable electrode or both of the first and second movable electrodes are displaced to change capacitance of only the first capacitance element or both of the first and second capacitance elements, and,
signals output from said plurality of patch electrodes corresponding to the capacitance of the first and second capacitance elements are added together so that a sum of the signals is output as a sensor output signal, and position information indicative of a position of a particular one of the patch electrodes which has output a signal of a maximum level among the signals output from said plurality of patch electrodes is output as pressure-applied-position information indicating a position of said first movable electrode to which the pressure has been applied.

29. The pressure sensor as claimed in claim 28 wherein, when two signals are output from two adjoining ones of the patch electrodes, a position in a boundary portion between the two adjoining patch electrodes in accordance with respective levels of the two signals is calculated, and the calculated position in the boundary portion is output as the pressure-applied-position information indicating the position of said first movable electrode to which the pressure has been applied.

30. A data input apparatus constructed to input operation information in response to operation of a pressure sensor as recited in claim 28.

* * * * *